United States Patent [19]
Ha

[11] Patent Number: 5,511,234
[45] Date of Patent: Apr. 23, 1996

[54] RADIO-FREQUENCY OUTPUT LEVEL COMPENSATING CIRCUIT OF PORTABLE RADIO TRANSCEIVER

[75] Inventor: Dong-In Ha, Seoul, Rep. of Korea

[73] Assignee: SamSung Electronics Co., Ltd., Kyungki, Rep. of Korea

[21] Appl. No.: 158,847

[22] Filed: Nov. 29, 1993

[30] Foreign Application Priority Data

Nov. 27, 1992 [KR] Rep. of Korea .................. 22625/1992

[51] Int. Cl.⁶ .................................................. H04B 1/04
[52] U.S. Cl. ........................................... 455/127; 455/126
[58] Field of Search ............................... 455/88, 89, 127, 455/126; 379/58

[56] References Cited

U.S. PATENT DOCUMENTS

| | | | |
|---|---|---|---|
| 4,523,155 | 6/1985 | Walczak et al. | 330/279 |
| 4,636,741 | 1/1987 | Mitzlaff | 330/127 |
| 4,654,882 | 3/1987 | Ikeda | 455/88 |
| 4,989,260 | 1/1991 | Meade | 455/95 |
| 5,036,532 | 7/1991 | Mtroka et al. | 379/58 |
| 5,193,219 | 3/1993 | Tamura | 455/89 |
| 5,203,020 | 4/1993 | Sato et al. | 455/68 |
| 5,367,556 | 11/1994 | Marui et al. | 379/58 |

*Primary Examiner*—Reinhard J. Eisenzopf
*Assistant Examiner*—Marsha D. Banks-Harold
*Attorney, Agent, or Firm*—Robert E. Bushnell

[57] ABSTRACT

A circuit for compensating a radio-frequency output level of a portable radio transceiver which full-duplex communicates by a power of battery is disclosed. The circuit includes a radio-frequency signal compensating device having a second power amplifier for power-amplifying an input radio-frequency signal up to a transmitting level corresponding to an input automatic power control voltage level, second transmitting circuit coupled to an output terminal of the second power amplifier for radio transmitting the amplified radio-frequency signal, second transmitting output control circuit for supplying a second automatic power control voltage to the second power amplifier in response to the input voltage of the predetermined output level, a second battery, and second power driving circuit for regulating the second battery voltage to the voltage of predetermined level and supplying the regulated voltage as an operational voltage of the respective units in the radio-frequency signal compensating device and a connecting circuit for connecting the voltage of predetermined output level to the second transmitting output control circuit and connecting an output of the first transmitting circuit to an input of the second power amplifier, and at the same time, providing a connection detecting signal to the first transmitting output control circuit.

37 Claims, 7 Drawing Sheets

RADIO-FREQUENCY OUTPUT LEVEL COMPENSATING CIRCUIT OF PORTABLE RADIO TRANSCEIVER

BACKGROUND OF THE INVENTION

The present invention relates to radio transceivers and more particularly to a radio-frequency output level compensating circuit for use in full duplex portable radio transceivers powered by a battery.

The cellular type mobile communication device was originally intended for use as a vehicular radio-telephone, but, currently, development has been directed towards a portable radio-telephone. Accordingly, development in the operational method of a cellular system also tends to change from being focussed on the conventional vehicular radio-telephones (with a transmitting output level in Class 1 and having a maximum transmitting output power of three Watts) to focussing on portable radio-telephones (with a transmitting output level in Class 3 and a maximum transmitting output power of 0.6 Watts). That is, with an increase in cells (microcells), users are able to communicate by using the transmitting output power of portable radio-telephones. In spite of this state of development however, there remains a problem because it is difficult for a user attempting to use portable radio-telephones to make a radio-call due to the location from which the portable radio-telephone is used. Portable radio-telephones are frequently used in vehicles because of their special characteristics. When a portable radio-telephone is used in a vehicle however, a radio wave is attenuated by the body of the vehicle, so that an actual radio-frequency signal transmitted or received through an antenna of the portable radio-telephone is attenuated. Accordingly, the user has difficulty in making a radiotelephone call.

A conventional circuit to solve the aforementioned problem has been disclosed in U.S. Pat. No. 4,636,741, issued 13 Jan. 1987 to James E. Mitzlaff. A vehicular adaptor is installed in a vehicle, and a multi-level power amplifier is mounted in the portable radio-telephone, so that the radio transmitting signal level is boosted when the portable radio-telephone is connected to the vehicular adaptor.

In Mitzlaff's circuit, if the portable radio-telephone is connected to the vehicular adaptor installed in a vehicle, a vehicular antenna is connected by means of a connector instead of the portable radio-telephone's antenna, and a voltage supplied to the multilevel power amplifier composed of multiple stages is supplied by the vehicle battery instead of the portable radio-telephone's battery. Also, the output level of the power amplifier in the portable radio-telephone is switched to a higher output level of Class 1 with a maximum output power level of three Watts rather than to an output level of the Class 3, 0.6 Watts maximum output power level of the portable radio-telephone, so that the power amplifier can transmit at a higher output level.

As described above, the typical conventional circuit operates with a transmitting level of "Class 3" when the multi-level power amplifier for the portable radio-telephone uses the battery of the portable radio-telephone. When a power source of a vehicle battery, which is larger than that of the battery of the portable radio-telephone, is connected and then used, the power amplifier is operated with a transmitting level of "Class 1", thereby solving the problem created when the portable telephones are used in vehicles.

However, when the multi-level power amplifier positioned within the portable radio-telephone for providing power amplification of the radio-frequency is operated at a level of "Class 1", its transmitting output level is high. The circuit of the portable radio-telephone should therefore use components which are capable of providing such an output. Accordingly, as the size of components of the multi-level power amplifier become larger, a heat emission processing device is also needed. This brings a problem of enlarging the size of portable radio-telephones. Particularly, when the portable radio-telephone is used for a long period of time, the heat generated during high output transmission is spread over the body of the portable radio-telephone. This causes a problem of providing an unpleasant feeling to the user, such as the portable radio-telephone being too hot to handle.

Also, the maximum three Watt transmitting output level of the power amplifier at the final stage, among the multi-level power amplifiers that are connected in cascade form using at least two or more power amplifiers, is higher than the maximum output of 0.6 Watts of the pre-power amplifier which inputs and power-amplifies the radio frequency signal. Thus, the magnitude of the power source supplied to the final output power amplifier should be higher than that of the power source supplied to the pre-power amplifier. To implement this, another extra power source would need to be supplied, and, as a result, the power source circuit becomes complicated.

The Vehicular Power Booster Circuitry For Multi-Level Portable Transceiver described in U.S. Pat. No. 5,193,219 to Yoshihara Tamura corrects for the enlargement of the Mitzlaff transceiver and its extra weight by contemplating the use of a booster having several operating voltage levels for use when the portable transceiver is mounted in a vehicle. The voltage level used in boosting the transmitting power is selected in response to a difference in an output level of the portable transceiver and an output level of the amplifier of the booster to keep this difference to a minimum.

The Method and Apparatus for Reducing Power Consumption In A Radio Telecommunication Apparatus disclosed in U.S. Pat. No. 5,203,020 to Sato et al. automatically disconnects the antenna and battery of the portable transceiver and connects the vehicle's battery and antenna to the portable radio telephone when mounting the portable radio telephone to the vehicle in response to the detection of the higher voltage supplied by the vehicles battery.

The Radio Communication Device and Method of Controlling Transmitter Output Level for a portable transceiver mountable in a vehicle disclosed in U.S. Pat. No. 4,654,882 to Shigeki Ikeda contemplates the controlling of the output transmitting power of the portable unit to a minimum level required for input to the amplifier of the fixed (vehicle mounted) unit to compensate for excessive heat. The Ikeda device uses the vehicle's battery and antenna when the portable unit is connected thereto.

The Portable Telephone With Power Source/Mode Change During Calls by Metroka et al. in U.S. Pat. 5,036,532 teaches the use of a vehicle's battery (see, e.g., FIG. 6) to operate the portable radio telephone by connecting the portable radio telephone to a mobile transceiver adaptor mounted in the vehicle. This arrangement however, relies upon a mobile transceiver and its antenna to improve transmission power and reception sensitivity, instead of the portable radio telephone's cellular transceiver and antenna.

SUMMARY OF THE INVENTION

Accordingly, it is an object of the present invention to provide an improved radio-frequency output level compensating circuit.

It is another object to provide a radio-frequency output level compensating circuit that can always maintain the same transmitting level of the radio-frequency signal generated from a portable radiotelephone and then propagated to the atmosphere when carried even when installed in a vehicle.

It is another object of the present invention to provide a radio-frequency signal compensating device that detects the connection between a power amplifier used in a portable radio-telephone and a radio-frequency signal compensating device having another power amplifier of the same kind, and then propagates a radio-frequency signal generated from the portable radio-telephone to a vehicular antenna without a loss.

It is still another object of the present invention to provide a circuit enabling a radio frequency signal compensating device to operate with power from either the power sources of a portable radio-telephone or a power source for a radio-frequency signal compensating device installed in vehicle.

To achieve these and other objects of the present invention, a radio-frequency output level compensating circuit is provided for a radio transmitter that amplifies the broadcast power and then propagates a radio-frequency signal generated from the radio transmitter. The compensating circuit embodies a radio-frequency signal compensating device having a second power amplifier for power-amplifying an input radio-frequency signal up to a transmission level corresponding to an input automatic power control voltage level, a second transmitting circuit coupled to an output terminal of the second power amplifier for transmitting the amplified radio-frequency signal, a second transmitting output control circuit for supplying a second automatic power control voltage to the second power amplifier in response to the input voltage of a predetermined output level, and a second battery. A second power driving circuit regulates the second battery voltage to the voltage of predetermined level and supplying the regulated voltage as an operational voltage of the respective units in the radio-frequency signal compensating device and a connecting circuit connects the voltage of predetermined output level to the second transmitting output control circuit and connects an output of the first transmitting circuit to an input of the second power amplifier, and at the same time, providing a connection detecting signal to the first transmitting output control circuit.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
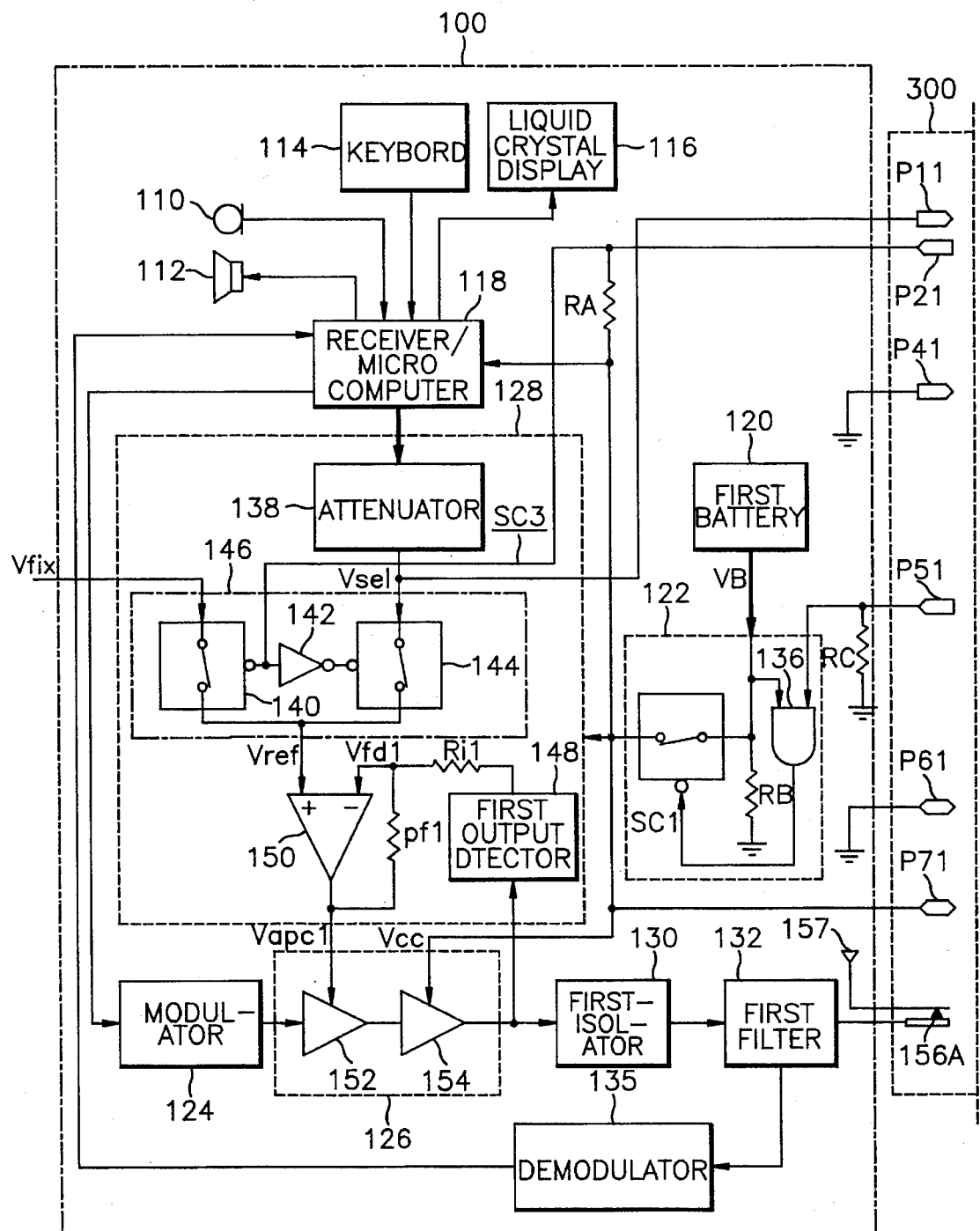
FIGS. 1A and 1B, in combination, illustrate a circuit diagram showing a radio-frequency output level compensating circuit of a portable radio transceiver according to the present invention.
Figure 1B:
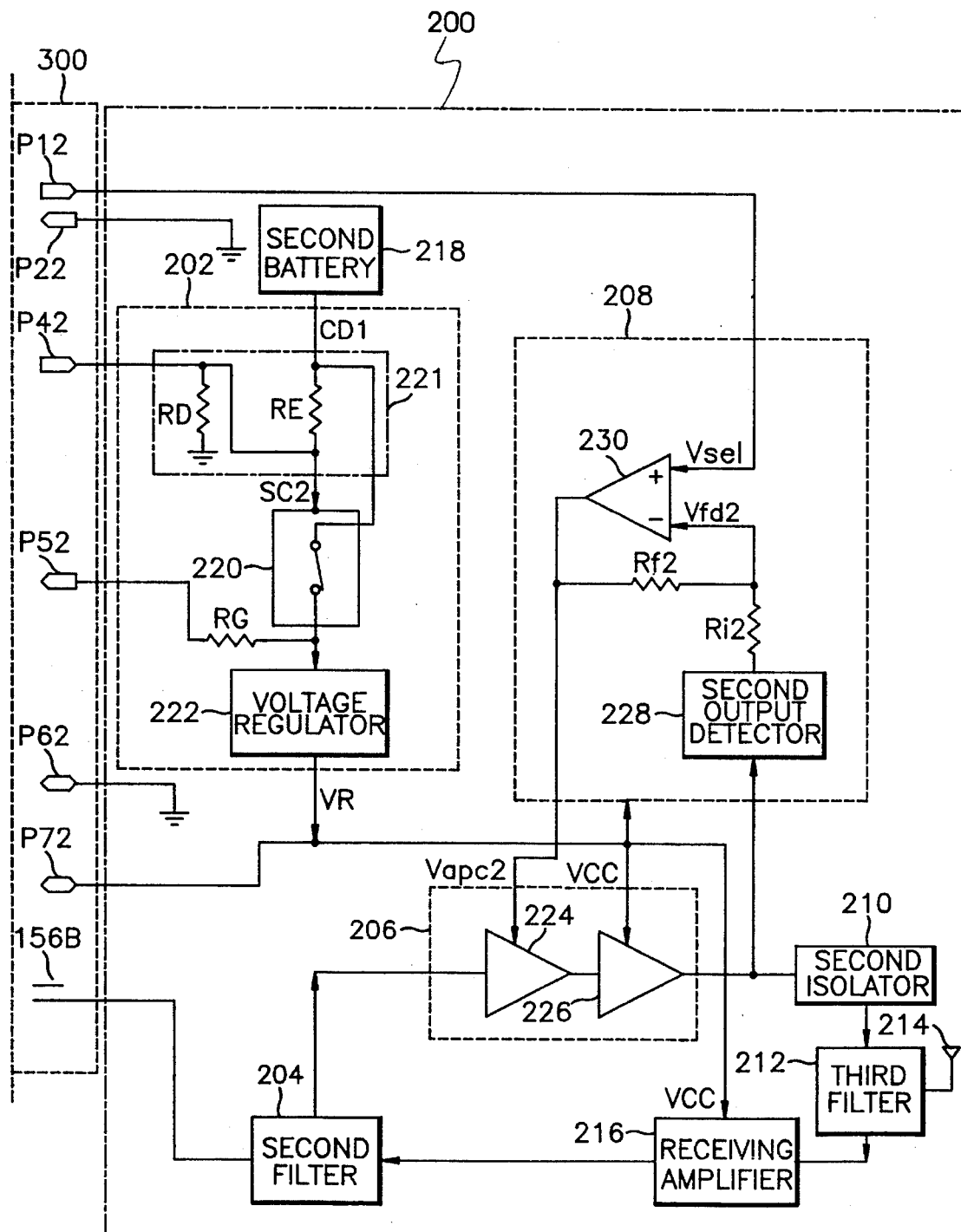

Turning now to the drawings, FIGS. 1A and 1B provide a detailed diagram of a portable radiotelephone having a radio-frequency signal compensating device according to the present invention, where the reference numerals 100 and 200 represent a portable radio-telephone and a radio-frequency signal compensating device, respectively.

The portable radio-telephone 100 comprises a microphone 110, a speaker 112, a keyboard 114, a liquid crystal display 116, a receiver/microcomputer (hereinafter referred to as "microcomputer") 118, a battery 120, a first power driver 122 for switching the supply of a voltage generated from the battery 120, a modulator 124 for modulating a signal in a sound band output from the microcomputer 118 and also generating a radio-frequency signal, a first power amplifier 126 for power-amplifying the radio-frequency signal to a level of "Class 3" by using inputs of a first automatic power control voltage Vapc1 and an operational voltage Vcc. Also, a first transmitting output controller 128 is coupled between the microcomputer 118 and the first power amplifier 126 to provide the automatic power control voltage Vapc1 to the first power amplifier 126. A first isolator 130 is to protect the first power amplifier 126 when a reflected wave is generated. Also, the portable radio-telephone 100 has a first filter 132 for separating a radio-frequency signal into transmit and receive bands, an antenna 157 connected to the first filter 132, and a demodulator 135 for demodulating an output of the first filter 132. Here, the first transmitter/receiver filter 132 and the antenna 157 are connected through a jack 156A.

A radio-frequency signal compensating device 200 includes a second battery, i.e. a vehicle battery 218, a second power driver 202 for regulating the voltage level of the vehicle battery 218 to a predetermined level, a second filter 204 for separating a radio-frequency signal into transmitting and receiving bands, a second power amplifier 206 for amplifying the radio-frequency signal output from the second filter 204 to the level of "Class 3" by a second automatic power control voltage Vapc2 and the operational voltage Vcc, a second transmitting output controller 208 for detecting and amplifying a difference between an output level selecting voltage Vsel and the transmitting level of a signal output from the second power amplifier 206 and generating said second automatic power control voltage Vapc2, a second isolator 210 coupled to an output terminal of the second power amplifier 206, a third filter 212 for separating a radio-frequency signal into transmitting and receiving bands, a second antenna 214 coupled to the third filter 212, and a receiving amplifier 216 for amplifying a received signal that is separated and output in the third filter 212 as a predetermined level and for supplying the amplified signal to the second filter 204. Here, the portable radio-telephone 100 and the radio-frequency signal compensating device 200 can be connected using a curly cord 300.

In the above constitution, the first power driver 122 in the portable radio-telephone 100 includes an AND gate 136 for AND-gating a voltage sensing signal CD1, supplied via curly cord connection P51 and P52, of the vehicle battery 218 and a voltage VB of the battery 120 to generate a first power switching control signal SC1. A first power switch 134 supplies or cuts off the voltage VB of the battery 120 as an operational power in the portable radio-telephone 100 in response to the first power switching control signal SC1. The first transmitting output controller 128 includes an attenuator 138 for generating the output level selecting voltage Vsel corresponding to 3-bit binary data output from the microcomputer 118 in order to control an output level of a radio-frequency signal, the first output detector 148 for detecting an output level of the first power amplifier 126 to generate a feedback voltage Vfd1 corresponding to the detected output level, the first amplifier 150 for amplifying a difference between the reference voltage Vref and the feedback voltage Vfd1 to generate and output the first automatic power control voltage Vapc1 as an operational voltage of the first power amplifier 126, and a radio-frequency compensation control signal outputting portion 146 for providing the output level selecting voltage Vsel as the reference voltage Vref of the first amplifier 150 and for switching to a predetermined output level control voltage Vfix as the reference voltage Vref in response to an input of the first connection detecting signal SC3. Here, the radio-frequency compensation control signal outputting portion 146 has a first control switch 140 coupled between the input line of the output level control voltage Vfix and the reference voltage terminal of the first amplifier 150 for switching in response to an input of the first connection detecting signal SC3, and a second control switch 144 coupled between an output terminal of the attenuator 138 and the reference voltage terminal of the first amplifier 150 for passing the output level selecting voltage Vsel as the reference voltage Vref and cutting off the output level selecting voltage Vsel in response to the input of an inverted first connection detecting signal SC3 through an inverter 142.

Meanwhile, the second power driver 202 comprises a second power switch 220 coupled to the vehicle battery 218 for passing a voltage of the vehicle battery 218 in response to an input of the second power switching control signal SC2, a voltage regulator 222 for regulating the voltage passed from the second power switch 220 to a voltage VR having the same level as the output voltage level of the portable battery 120, and a power controller 221 coupled between the vehicle battery 218 and the control signal input terminal of the second power switch 220 for generating the second power switching control signal SC2 in response to connection with the portable radio-telephone 100. The second transmitting output controller 208 comprises a second output detector 228 for detecting an output level of the second power amplifier 206 and outputting a feedback voltage Vfd2 corresponding to the detected output level, and a second amplifier 230 for amplifying a difference between the output level selecting voltage Vsel output from the first transmitting output controller 128 in the portable radiotelephone 100 and the feedback voltage Vfd2 to generate the second automatic power control voltage Vapc2 as an operational voltage for the second power amplifier 206.

The curly cord 300 coupled to the portable radiotelephone 100 and also to the radio-frequency signal compensating device 200 connects the respective parts as described in the following table 1.

TABLE 1-1

| Portable Radio-telephone 100 | Curly Cord 300 | Radio-Frequency Signal Compensating Device 200 |
|---|---|---|
| Output Terminal of Attenuator 138 | P11 ⇆ P12 | Non-inverting Terminal (+) of 2nd Amplifier |
| Input terminal of Inverter 142 | P21 ⇆ P22 | Ground |
| Ground | P41 ⇆ P42 | Connecting Node of Resistors RD and RE of Power Controller 221 |
| Input Terminal | P51 ⇆ P52 | Output Terminal of 2nd Power Switch 220 |
| Ground | P61 ⇆ P62 | Ground |
| Output Terminal of 1st Power Switch 134 | P71 ⇆ P72 | Output Terminal of Voltage Regulator 222 |
| Jack 156A for connecting Antenna 157 and 1st Filter 132 | 156A ⇆ 156B | Plug into Jack 156A to separate connection of Antenna 157 and 1st Filter 132 and also to input Radio-Frequency Signal |

The curly cord 300 connecting the two devices as described above has the radio-frequency RF cables 156A and 156B at its center whose peripheries of the RF cables are enclosed with a coated wire and a cotton filter, and are coated with an outer cover composed of a tape and a cable.

Figure 2A:
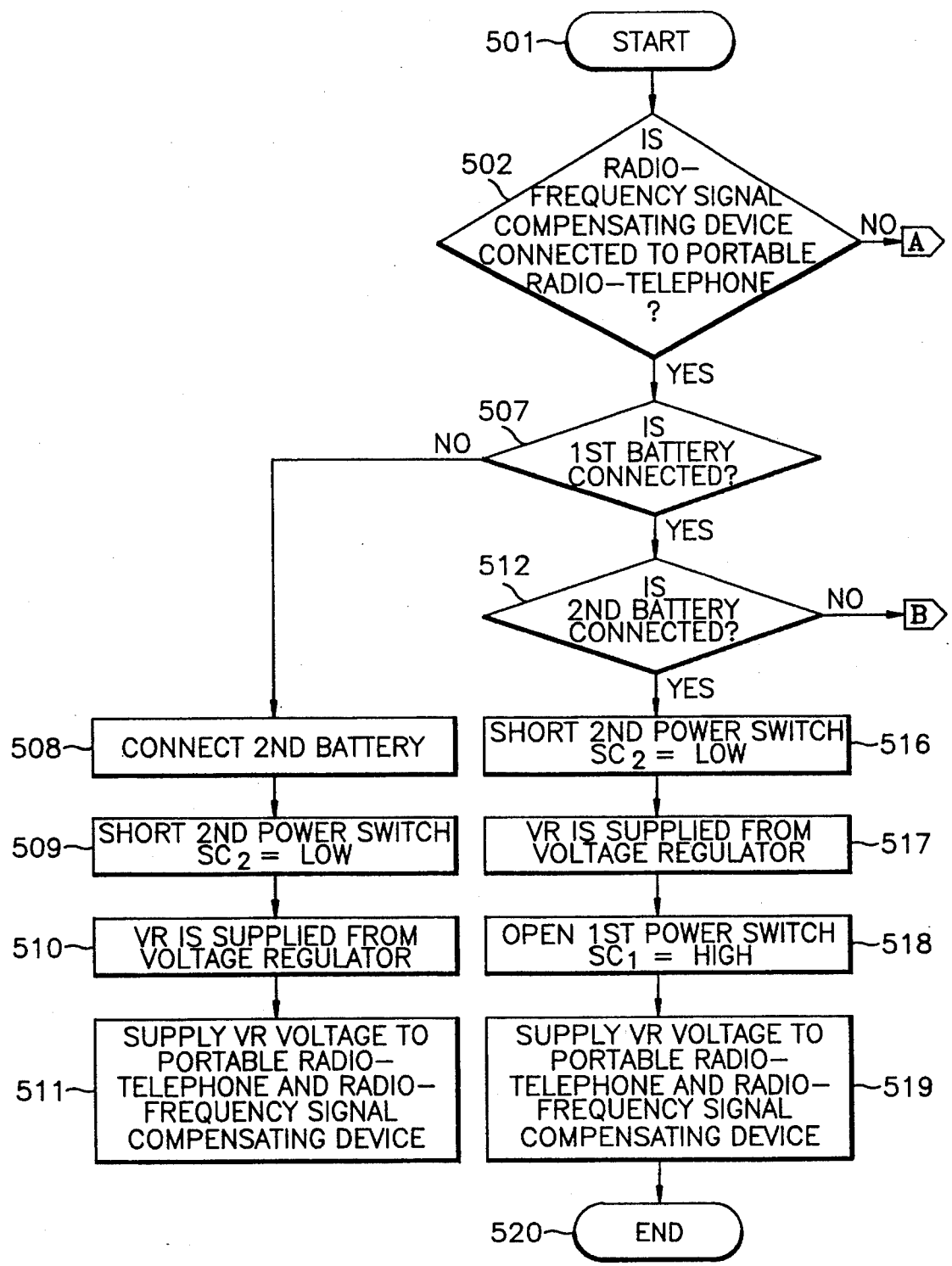
FIGS. 2A and 2B, in combination, represent a flow chart showing the switching operation of a power source in the radio-frequency output level compensating circuit shown in FIGS. 1A and 1B.
Figure 2B:
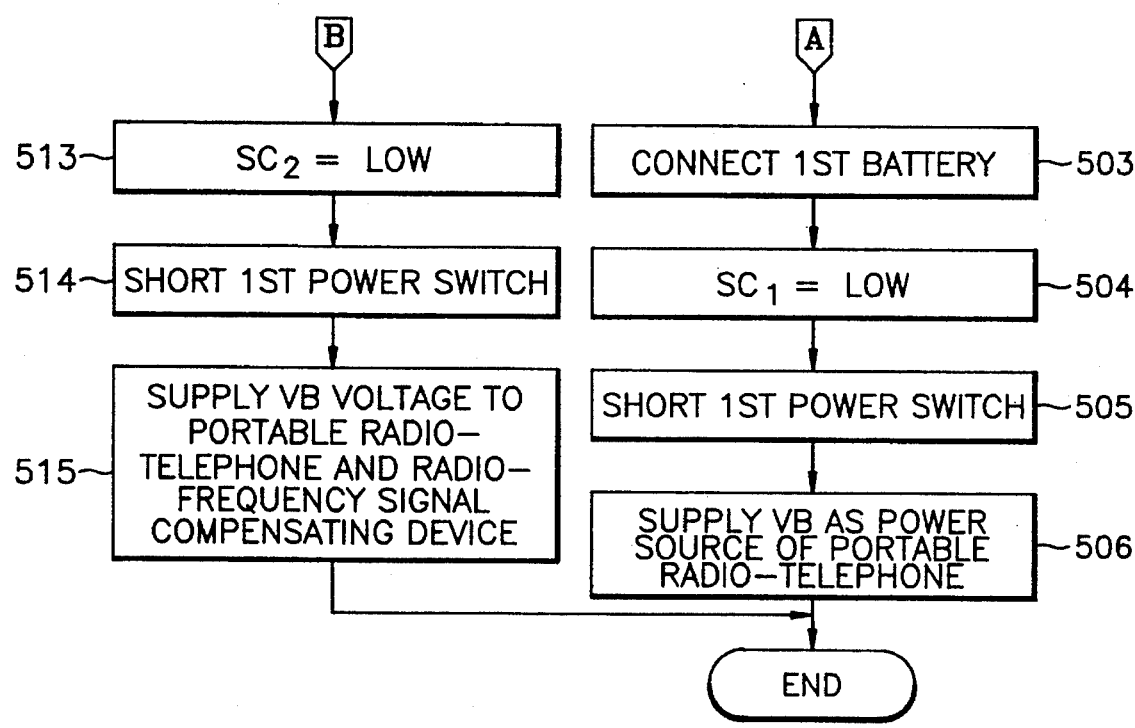

FIGS. 2A and 2B illustrate is a flow chart showing power switching processing steps in FIGS. 1A and 1B.

The processing steps in FIGS. 2A and 2B are differentiated into power switching processing steps when the portable radiotelephone 100 and the radio-frequency signal compensating device 200 are not connected, and other power switching processing steps when they are connected with the curly cord 300.

Figure 3:
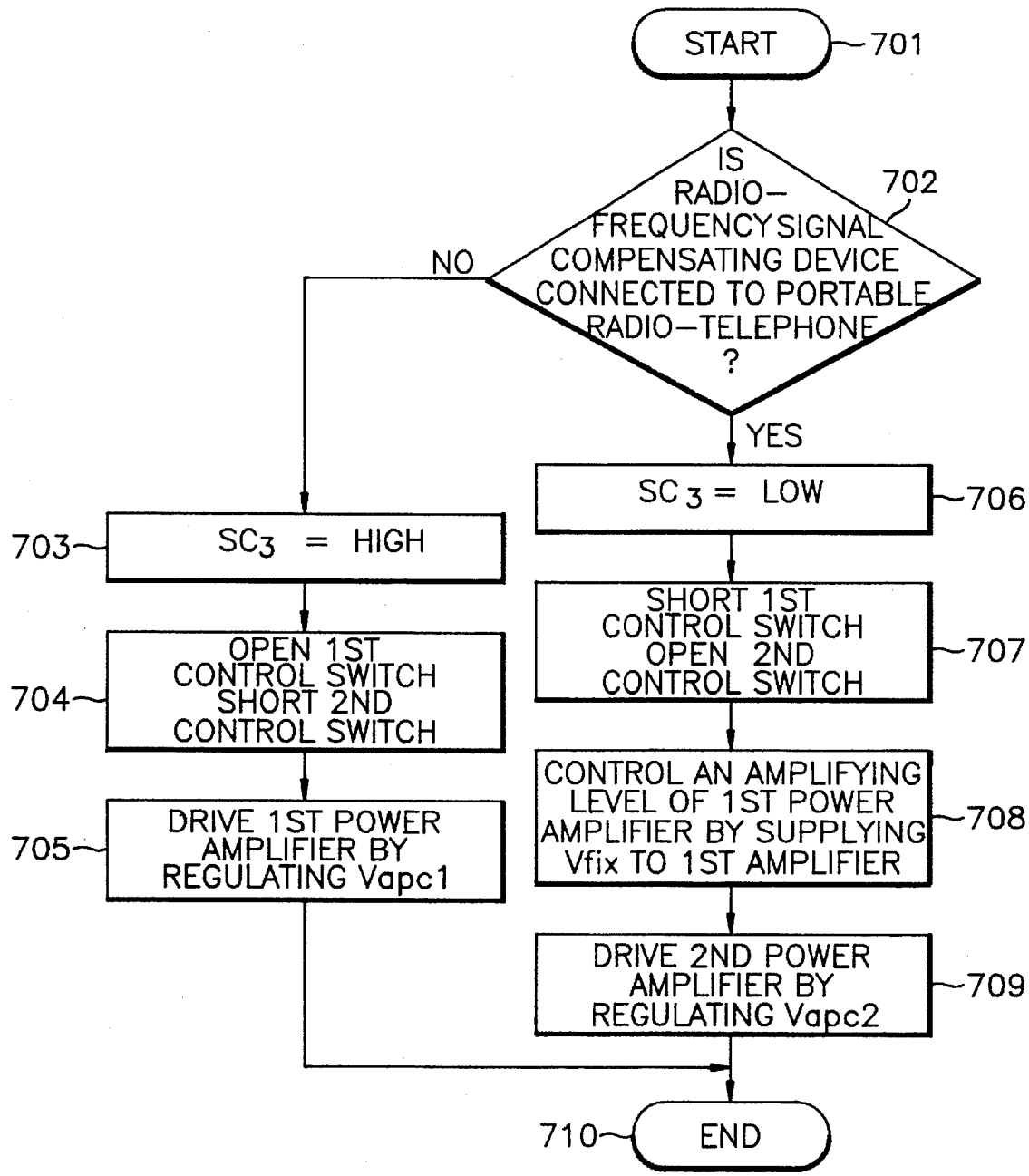
FIGS. 3 is a flow chart showing control of transmitting output level in the radio-frequency output level compensating circuit shown in FIGS. 1A and 1B.

FIG. 3 is a flow chart showing radio-frequency signal level processing steps of Figs. 1A and 1B. The processing steps of FIG. 3 are distinguished according to whether the portable radio-telephone 100 and the radio-frequency signal compensating device 200 are connected.

Figure 4:
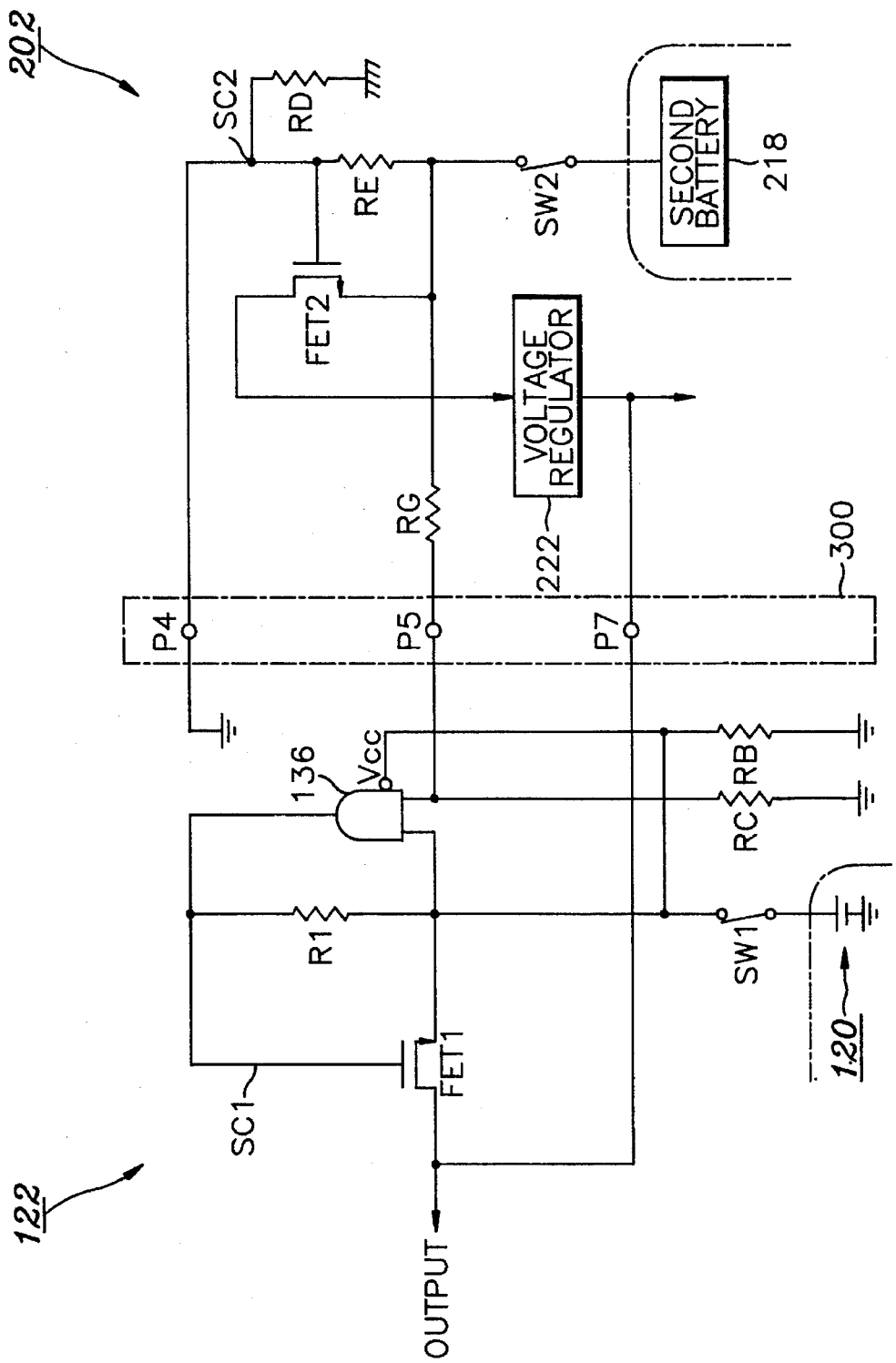
FIG. 4 is a detailed diagram of first and second power supplying portions shown in FIGS. 1A and 1B.

FIG. 4 is a detailed block diagram of the first and second power drivers 122 and 202 shown in FIGS. 1A and 1B.

Figure 5:
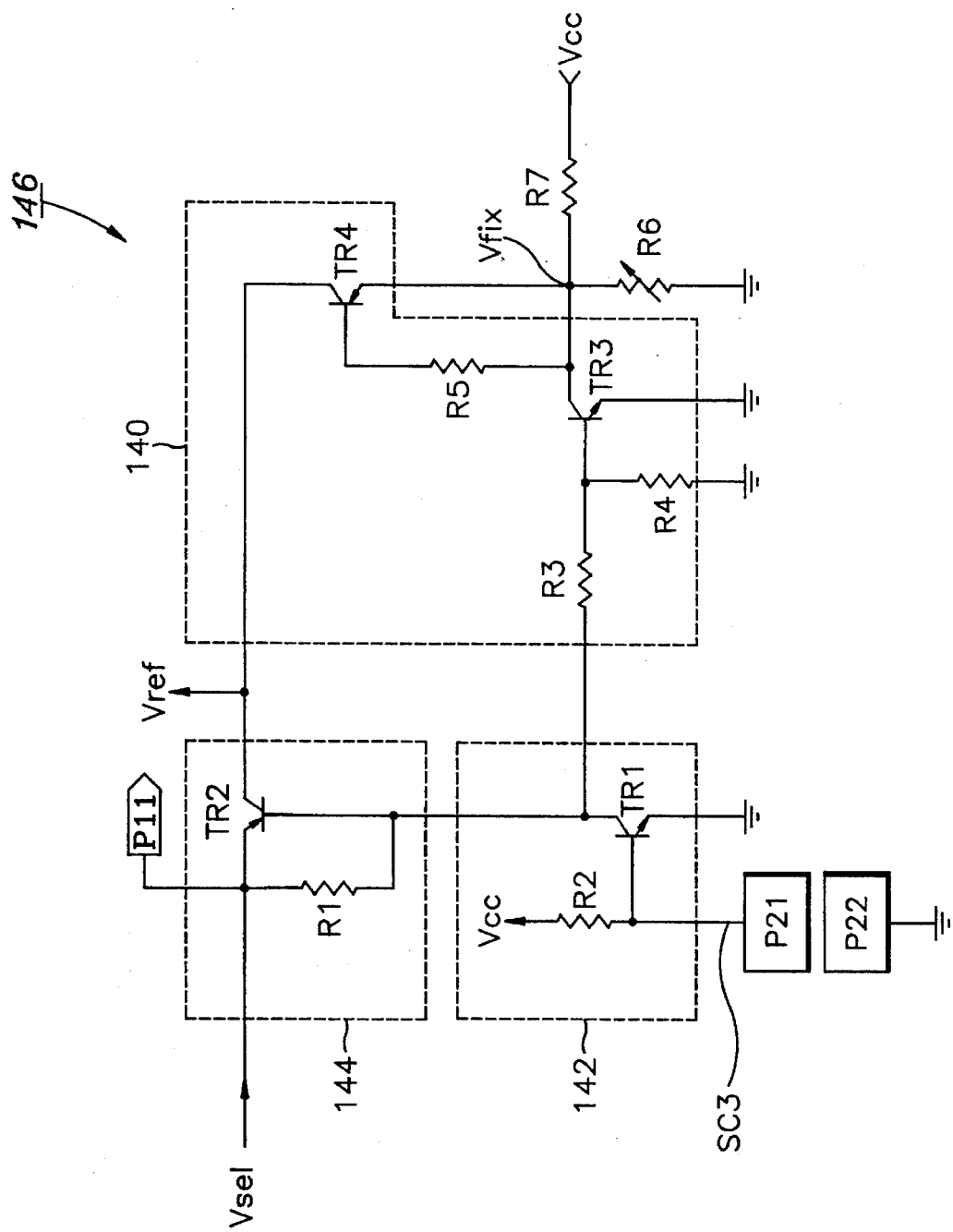
FIG. 5 is a detailed diagram of a radio-frequency compensation control signal outputting portion shown in FIGS. 1A and 1B.

FIG. 5 is a block diagram showing an embodiment of the radio-frequency compensation control signal outputting portion 146 shown in FIG. 1A.

In FIG. 5, transistor TR1 and resistor R2 correspond to inverter 142, transistor TR2 and resistor R1 correspond to second control switch 144, and two transistors TR3 and TR4 and three resistors R3, R4, R5 correspond to first control switch 140. Also, resistor R7 and variable resistor R6, coupled in series between power supply voltage Vcc and ground GND, voltage-divide the power supply voltage Vcc to set output level control voltage Vfix having a predetermined level.

Hereinafter, the present invention is described in detail with reference to the constitution shown in FIGS. 1A through 5.

The use of the present invention can be mainly separated into two: (1) using only the portable radio-telephone 100; and (2) using the portable radio-telephone connected to the radio-frequency signal compensating device 200 with the curly cord 300, as known in Figs. 1A and 1B which shows the relationship between the portable radio-telephone 100 and the radio-frequency signal compensating device 200 mounted in a vehicle.

First of all, the use of only the portable radiotelephone 100 is described as follows. If the switch SW1 of FIG. 4 is switched by the user to be on and a battery 120, i.e., a power source of the portable radio-telephone 100, is connected, the first power driver 122 performs process steps 503 to 506 as shown in FIGS. 2A and 2B. The operational process is described in detail with reference to FIG. 4 as follows.

Now, while the curly cord 300 and the portable radiotelephone 100 are separated, if the switch SW1 indicating the presence of battery 120 is shorted, i.e. turned on, the voltage VB of the battery indicative of the magnitude of the battery 120 is input to the source of field effect transistor FET1 corresponding to the first power switch 134 and one terminal of the AND gate 136. The other input terminal of the AND gate 136 is grounded by a pull-down resistor RC. Accordingly, the output terminal of the AND gate 136, connected to the gate terminal of field effect transistor FET1, i.e. the control terminal of first power switch 134, becomes "low" state. The field effect transistor FET1, i.e., P-type field effect transistor, is turned on by the above operation. The voltage VB of the battery 120 is generated to the drain of the field effect transistor FET1 by the turning on of the switch of the field effect transistor FET1 and is supplied to the respective units of the portable radio-telephone 100.

At this time, referring to FIG. 1A, the microcomputer 118, outputs 3-bit binary data to the attenuator 138 for setting a radio-frequency transmitting level to a level of "Class 3" used in a portable radio-telephone (here, "Class 3" has a maximum output transmitting power of 0.6 Watts as a reference and is adjustable in 6 steps, each of 4 dB intervals). The attenuator 138 supplies the output level selecting voltage Vsel corresponding to the 3-bit binary data to the second control switch 144 implemented with the transistor TR2 as shown in FIG. 5. The attenuator 138 used in the present invention may be manufactured using an analog multiplexer, such as MC14051 of Motorola Inc., and provides outputs in total 8 steps according to the 3-bit binary data output from the microcomputer 118.

The output level selecting voltage Vsel, output from the attenuator 138, is input to the second control switch 144 of the radio-frequency compensation control signal output stage 146 constituted as shown in FIG. 5. That is, the output level selecting voltage Vsel is input to an emitter of the transistor TR2 constituting the second control switch 144. At this time, in the use of only the portable radio-telephone 100, the first connection detecting signal SC3 corresponding to a switching control signal of the first and second control switches 140 and 144 is pulled up by the resistor RA and is in a "high" logic state. That is, the terminals P21 and P22 of the curly cord 300 are open. Accordingly, the transistor TR1 corresponding to the inverter 142 and the transistor TR2 corresponding to the second control switch 144 are turned on whereas the transistors TR3 and TR4 corresponding to the first control switch 140 are turned off.

Accordingly, the output level selecting voltage Vsel, output from the attenuator 138, is supplied as the reference voltage Vref of non-inverting terminal (+) of the first amplifier 150 through both the emitter and collector of the transistor TR2, of FIG. 5, which correspond to the second control switch 144. A feedback voltage Vfd1 generated from the first output detector 148, of FIG. 1A, is supplied to the inverting terminal (−) of the first amplifier 150. Here, the first output detector 148 detects a level of the radio-frequency signal output from the first power amplifier 126 and outputs the feedback voltage Vfd1 corresponding to the detected level. At this time, the first amplifier 150 amplifies a difference between the output level selecting voltage Vsel and the feedback voltage Vfd1, and then supplies a first automatic power control voltage Vapc1 as an operational voltage of the pre-power amplifier 152 which is in the first power amplifier 126 (steps 702 to 705 in FIGS. 3).

While the first automatic power control voltage Vapc1 is supplied to the first power amplifier 126, if the radio-frequency signal is input to the first power amplifier 126 through the microphone 110, the microcomputer 118 and the modulator 124, the first power amplifier 126 amplifies the received radio-frequency signal to an output level corresponding to the first automatic power control voltage Vapc1 and provides the amplified signal to the first isolator 130. The radio-frequency signal output from the first isolator 130 is propagated to the first antenna 157 through the first filter 132. And, the radio-frequency signal received through the first antenna 157 is transferred to both the microcomputer 118 and a telephone receiver 112 through the first filter 132 and the demodulator 135. Here, the first automatic power control voltage Vapc1 is a voltage adjusted to the level of "Class 3" by 3-bit binary data output from the microcomputer 118. Accordingly, in the case of only using the portable radio-telephone 100 independently, the radio-frequency signal is power-amplified to the output level of "Class 3" and is transmitted.

Hereinafter, it is described as an example that a user uses the portable radio-telephone 100 connected to the radio-frequency signal compensating device 200 installed in a vehicle, so as to communicate with a radio-telephone in a shut vehicle.

The portable radio-telephone 100 and the radio-frequency signal compensating device 200 installed in a vehicle are connected using a curly cord 300 to enable the user to make a smooth telephone call as described above. If the portable radio-telephone 100 and the radio-frequency signal compensating device 200 are connected using the curly cord 300 as described above, the respective units in the portable telephone 100 and the respective units in the radio-frequency signal compensating device 200 are connected as shown in the aforementioned Table 1.

The transmitting/receiving terminal of the first filter 132 in the portable radio-telephone 100 is separated from the first antenna 157 by the above connection operation, and is connected to the transmitting/receiving terminal of the second filter 204 positioned in the radio-frequency signal compensating device 200 instead.

At this time, if one mode out of three modes is selected according to the supplying states of the battery in both the portable radio-telephone 100 and the vehicle battery 218 as shown in the flow chart of FIGS. 2A and 2B, the supply of the power source supplied to the portable radio-telephone 100 and the radio-frequency signal compensating device 200 is initiated according to the corresponding mode. The supplying operation of the power source according to the connection state of the batteries is described with reference to FIGS. 4 and 5 as follows.

First of all, in FIG. 4, if the second battery switch SW1 for providing a supply path of voltage VB output from the battery 120 in the portable radio-telephone 100 is shorted (i.e., on) and the second battery switch SW2 for supplying a power source of the vehicle battery 218 is opened (i.e., off), then the voltage VB of the battery 120 is supplied to the source of field effect transistor FET1 corresponding to the first power switch 134 and also to one terminal of the AND gate 136. At this time, the power source of ground level is supplied by a pull-down resistor RC to another terminal of the AND gate 136, so that the field effect transistor FET1 is turned on. Accordingly, if only the first battery switch SW1 is shorted, the voltage VB of the battery 120 is transferred to the respective units of the portable radio-telephone 100 through the source and drain of the field effect transistor FET1, and at the same time, the voltage VB is supplied as an operational power source of the respective units of the radio-frequency signal compensating device 200 through the terminals P71 and P72 of the curly cord 300 (steps 507, 512 and 513 to 515 of FIGS. 2A and 2B). At this time, the field effect transistor FET2 corresponding to the second power switch 220 is opened because the power source of the vehicle battery 218 is not supplied.

In contrast to the above state, in FIG. 4, if the first battery switch SW1 coupled to the battery 120 is opened and the second battery switch SW2 is shorted, the gate of field effect transistor FET2 corresponding to the second power switch 220 receives a second power switching control signal SC2 having a ground level by connection of terminals P41 and P42 of the curly cord 300. Accordingly, the P-type field effect transistor FET2 is turned on, thereby supplying a voltage of the vehicle battery 218 to the voltage regulator 222 through the source-drain of the field effect transistor FET2. The voltage regulator 222 receiving the output voltage of the vehicle battery 218 through the second power switch 220, i.e., field effect transistor FET2, regulates an output voltage of the vehicle battery 218 to become a voltage VR having almost the same magnitude as that of the battery voltage VB in the portable radio-telephone 100 and then outputs the regulated voltage. The voltage VR regulated as described above is supplied as an operational voltage of the respective units in the radio-frequency signal compensating device 200 and also is supplied as an operational voltage of the respective units in the portable radio-telephone 100 through the connection terminals P72 and P71 of the curly cord 300. At this time, the field effect transistor FET1 corresponding to the first power switch 134 is at an "off" state because the voltage VB of the battery 120 is not supplied (steps 507, 508 to 511 in FIGS. 2A and 2B).

If the battery 120 of the portable radio-telephone 100 and the vehicle battery 218 of the radio-frequency signal compensating device 200 are all connected, i.e., if the first battery switch SW1 and the second battery switch SW2 are all shorted, then the voltage VB of the battery 120 is supplied to one terminal of the aforementioned AND gate 136, whereas the voltage divided by the resistors RG and RC serially connected between the output terminal of the vehicle battery 218 and the ground is supplied to the other terminal. The first power switching control signal SC1 output from the AND gate 136 is output as "high" logic. The P-type field effect transistor FET1 corresponding to the first power switch 134 is turned off by the above operation. Meanwhile, the field effect transistor FET2 corresponding to the second power switch 220 is turned on by the same operation as in connection with only vehicle battery 218. Accordingly, the regulated voltage VR output from the voltage regulator 222 is supplied as an operational power source of the respective units in the radio-frequency signal compensating device 200 and also is supplied as a power source of the portable radio-telephone 100 through the connected terminals P71 and P72 of the curly cord 300 (steps 507, 512, and 516 to 519 in FIGS. 2A and 2B).

Accordingly, if the radio-frequency signal compensating device 200 and the portable radio-telephone 100 are connected to each other by the curly cord 300, the present invention has a characteristic that a power source output from any one battery out of the batteries used in the two devices can be used as a power source for two devices.

While the operational power source is supplied to the respective portions as described above, if a radio-frequency signal is generated through microphone 110, microcomputer 118 and modulator 124 in the portable radio-telephone 100, it is supplied to the first power amplifier 126 as described above. At this time, the first power amplifier 126 amplifies the radio-frequency signal up to a predetermined transmitting level. The amplified radio-frequency signal is supplied to the first filter 132 through the first isolator 130. At this time, the radio-frequency signal output from the first filter 132 is supplied to the second power amplifier 206 through the jack 156A and the plug 156B of the curly cord 300, and then also through the second filter 204, instead of the first antenna 157. At this time, the first power amplifier 126 should power-amplify the received radio-frequency signal to a proper level for driving the second power amplifier 206. That is, the received radio-frequency signal should be amplified up to a level considering a radio-frequency loss (about 0.5 dB) of the first isolator, a radio-frequency loss (about 2 to 3 dB) of the first filter 132, a radio-frequency loss (about 3 dB) of the RF cable in the curly cord 300, and a radio-frequency loss (about 2 to 3 dB) of the second filter 204. At this time, the proper level value which should be generated from the first power amplifier 126 is related to the characteristic of the input level of the second power amplifier 206. But, if, as an example, PF0025 manufactured by Japanese semiconductor maker, Hitachi, Ltd., is used for the second power amplifier 206, the proper level is calculated as follows.

$$0dBm \leq X < 2dBm \tag{1}$$

Where: X is the value obtained by subtracting a total radio-frequency loss of 9.5 dB from the input level of 2nd power amplifier 206.

Accordingly, the proper level to be generated from the first power amplifier 126 should be about 11 dBm. The output level of the first power amplifier 126 is controlled by the operation of the radio-frequency compensation control signal outputting portion 146 including the first and second control switches 140 and 144. This is described with reference to FIGS. 3 and 5 as follows.

If the portable radio-telephone 100 and the radio-frequency signal compensating device 200 are connected, the first connection detecting signal SC3 becomes "low" state by connection of the terminals P21 and P22 of the curly cord 300. At this time, the transistor TR1 which is an inverter 142 becomes "off" state. Accordingly, the transistor TR2 corresponding to the second control switch 144 is turned off, and accordingly the output level selecting voltage Vsel output from the aforementioned attenuator 138 is supplied as a reference voltage to the non-inverting terminal (+) of the second amplifier 230 in the radio-frequency signal compensating device 200 through terminals P11 and P12 of the curly cord 300. Meanwhile, the transistors TR3 and TR4 corresponding to the first control switch 140 are switched to an "on" state in response to turning off of the transistor TR1 corresponding to the inverter 142. A predetermined output level control voltage Vfix which is voltage-divided by the resistor R7 and the variable resistor R6 is output from the output terminal of the first control switch 140, i.e., the collector of the transistor TR4, by the above switching.

Here, the output level control voltage Vfix is a voltage set to make the output level of the first power amplifier 126 to be 11 dBm. Accordingly, the output level control voltage Vfix is input to the non-inverting terminal (+) of the first amplifier 150, and the feedback voltage Vfd1 output from the first output detector 148 is supplied to the inverting terminal (−). The first amplifier 150 amplifies the difference between a control voltage Vfix of the predetermined output level and the feedback voltage Vfd1 and supplies the voltage-level boosted first automatic power control voltage Vapc1 as an operational control voltage of the first power amplifier 126. At this time, the first power amplifier 126 amplifies the received radio-frequency signal up to a proper level (11 dBm) by the above boosted first automatic power control voltage Vapc1. The output of the first power amplifier 126 is supplied as an input signal of the second power amplifier 206 through the first isolator 130, the first filter 132, the RF cable in the curly cord 300, and the second filter 204.

Since the second power amplifier 206 receiving the radio-frequency signal through the above path uses a power amplifier of the same kind as the above first power amplifier 126, its transmitting output is the same as the transmitting output (Class 3) in using only the portable radio-telephone 100. That is, when only the portable radiotelephone 100 is used, the output level selecting voltage Vsel output from the attenuator 138 is used as it is in order to regulate the transmitting output toward "Class 3", so that the output level of the second power amplifier 206 becomes same as the output of the first power amplifier 126.

The step that the output of the second power amplifier 206 becomes "Class 3" level by the output level selecting voltage Vsel output from the attenuator 138 is as follows. If the two devices are connected by the curly cord 300, the second control switch 144 becomes "off" state, thereby supplying the output level selecting voltage Vsel output from the attenuator 138 to the non-inverting terminal (+) of the second amplifier 230 as a reference voltage. At this time, the feedback voltage Vfd2 generated by the second output detector 228 is supplied to the inverting terminal (−) of the second amplifier 230. The second amplifier 230 amplifies the difference between the output level selecting voltage Vsel and the feedback voltage Vfd2. As the result of the amplifying, the second automatic power control voltage Vapc2 is generated and is supplied to the second power amplifier 206. The second automatic power control voltage Vapc2 makes the output level of the second power amplifier 206 be in "Class 3" (6-step level). The second power amplifier 206 amplifies the received radio-frequency signal to a corresponding level, and the amplified signal is propagated through the second antenna 214 through the second isolator 210 and the third filter 212. At this time, the transmitting output generated in the second power amplifier 206 has the same magnitude as the transmitting output transmitted in the first power amplifier 126 when only the portable radio-telephone 100 is used.

In summary, the transmitting power of the portable radiotelephone 100 is propagated through the second antenna 214 without any loss by using the radio-frequency signal compensating device 200 connected between the portable radiotelephone 100 and the second antenna 214 installed in the vehicle. At this time, the receiving path is backwardly formed. That is, the radio-frequency signal input in the second antenna 214 is received-in the telephone receiver 112 through the third filter 212, the receiving amplifier 216, the second filter 204, the modulator 135 and the microcomputer 118. Here, the receiving amplifier 216 functions to amplify the radio-frequency signal output from the third filter 212 to compensate the radio-frequency loss of the second filter 204, the RF cable in the curly cord 300 and the first filter 132.

As described above, according to the present invention, the radio-frequency signal compensating device having a power amplifier of the same kind as that used in the portable radio-telephone is used in connection with the portable radio-telephone, so that it provides smoother communication to the user due to the magnitude of the transmitting output from the portable radiotelephone. Since the power amplifier of the same kind having the lower operating power as that used in the portable radiotelephone is used in the radio-frequency signal compensating device, smaller products can be used as radio-frequency related elements, thereby further miniaturizing the size of the radio-signal compensating device.

What is claimed is:

1. A radio-frequency output level compensating circuit of a radio transmitter, comprising:

a first power amplifier for power-amplifying a first radio-frequency signal up to a transmitting level corresponding to a first level of automatic power control voltage and to generate a first amplified radio-frequency signal;

a second power amplifier for power-amplifying a second radio-frequency signal up to a transmitting level corresponding to a second level of automatic power control voltage and to generate a second amplified radio-frequency signal;

first transmitting means coupled to output terminal of said first power amplifier for radio-transmitting said first amplified radio-frequency signal;

second transmitting means coupled to output terminal of said second power amplifier for radio-transmitting said second amplified radio-frequency signal;

first transmitting output control means for supplying said first automatic power control voltage in response to an input of a voltage of a predetermined output level to said first power amplifier and generating said first automatic power control voltage having a level of said predetermined output level in response to an input of a connection detecting signal;

second transmitting output control means for supplying said second automatic power control voltage to said second power amplifier in response to said input of said voltage of the predetermined output level; and connecting means for providing said voltage of predetermined output level to said first transmitting output control means and connecting an output of said first transmitting means to an input of said second power amplifier, and at the same time, providing said connection detecting signal to said first transmitting output control means.

2. The circuit as claimed in claim 1, wherein said first transmitting output control means comprises:

first output detecting means for detecting an output level of said first power amplifier to generate a feedback voltage corresponding to the detected level;

first amplifying means for amplifying a difference between a reference voltage and said feedback voltage to generate said first automatic power control voltage as an operational voltage of said first power amplifier; and radio-frequency compensation control signal generating means for providing said voltage of predetermined output level as the reference voltage of said first amplifying means and generating said reference voltage as having the level of said voltage of predetermined output level in response to said input of said connection detecting signal.

3. The circuit as claimed in claim 2, said first power amplifier for compensating for a power loss of radio-frequency signal due to connection of a transmitting path between said first transmitting means and said connecting means in response to said voltage of predetermined output level.

4. The circuit as claimed in claim 1, wherein said first transmitting means comprises:
   a first isolator coupled to an output terminal of said first power amplifier;
   a first filter for separating transmitting and receiving signals; and
   an antenna for propagating an output of said first filter to the atmosphere.

5. The circuit as claimed in claim 4, wherein said first transmitting output control means comprises:
   first output detecting means for detecting an output level of said first power amplifier to generate a feedback voltage corresponding to the detected level;
   first amplifying means for amplifying a difference between a reference voltage and said feedback voltage to generate said first automatic power control voltage as an operational voltage of said first power amplifier; and
   radio-frequency compensation control signal generating means for providing said voltage of predetermined output level as the reference voltage of said first amplifying means and generating said reference voltage as having the level of said voltage of predetermined output level in response to said input of said connection detecting signal.

6. The circuit as claimed in claim 5, wherein said radio-frequency compensation control signal generating means comprises:
   first voltage supplying means for providing said voltage of predetermined output level as a reference voltage of said first amplifying means and cutting off the provided voltage of predetermined output level in response to an inverted input of said connection detecting signal; and
   second voltage supplying means for supplying an output level selecting voltage, in response to a non-inverted input of said connection detecting signal which is higher than said voltage of predetermined output level, as said reference voltage.

7. The circuit as claimed in claim 5, wherein said first and second power amplifiers are the same kind.

8. The circuit as claimed in claim 4, wherein said second transmitting output control means comprises:
   second output detecting means for detecting an output level of said second power amplifier to generate a feedback voltage corresponding to the detected level; and
   second amplifying means for amplifying a difference between an output level selecting voltage generated by said radio-frequency compensation control signal generating means and said feedback voltage from said second output detecting means to generate said second automatic power control voltage as an operational voltage of said second power amplifier.

9. The circuit as claimed in claim 8, wherein said connecting means comprises a curly cord for connecting said voltage of predetermined output level to an input of said first amplifying means.

10. The circuit as claimed in claim 9, wherein said first transmitting output control means comprises:
    first output detecting means for detecting an output level of said first power amplifier to generate a feedback voltage corresponding to the detected level;
    first amplifying means for amplifying a difference between a reference voltage and said feedback voltage to generate said first automatic power control voltage as an operational voltage of said first power amplifier; and
    radio-frequency compensation control signal generating means for providing said voltage of predetermined output level as the reference voltage of said first amplifying means and generating said reference voltage as having the level of said voltage of predetermined output level in response to said input of said connection detecting signal.

11. The circuit as claimed in claim 10, wherein said radio-frequency compensation control signal generating means comprises:
    first voltage supplying means for providing said voltage of predetermined output level as a reference voltage of said first amplifying means and cutting off the provided voltage of predetermined output level in response to an inverted input of said connection detecting signal; and
    second voltage supplying means for supplying an output level selecting voltage, in response to a non-inverted input of said connection detecting signal which is higher than said voltage of predetermined output level, as said reference voltage.

12. The circuit as claimed in claim 10, wherein said first and second power amplifiers are the same kind.

13. A radio-frequency output level compensating circuit for a radio transmitter, comprising:
    a radio transmitting device having a first power amplifier for power-amplifying an input radio-frequency signal for generating an amplified radio-frequency signal at a transmitting level corresponding to an input automatic power control level, first transmitting means coupled to an output terminal of said first power amplifier for radio-transmitting said amplified radio-frequency signal, first transmitting output control means for supplying a first automatic power control voltage corresponding to a voltage of a predetermined output level to said first power amplifier, and controlling a first transmitting output with said first automatic power control voltage in response to an input of a connection detecting signal, a first battery having a first battery voltage, and first power driving means for supplying said first battery voltage as an operational supply voltage of the respective circuits in said radio transmitting device;
    a radio-frequency signal compensating device having a second power amplifier for power-amplifying an input radio-frequency signal up to a transmitting level corresponding to an input automatic power control voltage level, second transmitting means coupled to an output terminal of said second power amplifier for radio transmitting said amplified radio-frequency signal, second transmitting output control means for supplying a second automatic power control voltage to said second power amplifier in response to an input of said voltage of predetermined output level, a second battery having a second battery voltage greater than said first battery voltage, and second power driving means for regulating said second battery voltage to said voltage of predetermined output level and supplying the regulated voltage as an operational voltage of the respective units in said radio-frequency signal compensating device; and connecting means for connecting the voltage of predetermined output level to said first transmitting output control means and connecting an output of said first transmitting means to an input of said second power amplifier, and at the same time, providing said connection detecting signal to said first transmitting output control means.

14. The circuit as claimed in claim 13, wherein said connecting means connects a supply voltage line of said radio transmitting device to a supply voltage line of said radio-frequency signal compensating device, and at the same time, provides first and second connection signals indicating that said radio-transmitting device and said radio-frequency signal compensating device are connected, and provides the second battery voltage to the radio-transmitting device.

15. The circuit as claimed in claim 14, wherein said first power driving means comprises:

a first power switch for supplying said first battery voltage to said supply voltage line of said radio transmitting device, and cutting off said first battery voltage in response to an input of a first power switching signal; and power control signal generating means for generating and supplying said first power switching signal to said first power switch in response to inputs of said second battery voltage and said first battery voltage.

16. The circuit as claimed in claim 15, wherein said second power driving means comprises:

a second power control switch for passing and cutting off said second battery voltage in response to said second connection signal; and a voltage regulator for regulating a level of said second battery voltage, passed by said second power switch, to a level of said first battery voltage.

17. The circuit as claimed in claim 15, wherein said first transmitting output control-means comprises:

first output detecting means for detecting an output level of said first power amplifier and generating a first feedback voltage corresponding to the detected level;

first amplifying means for amplifying a difference between a reference voltage and said first feedback voltage and generating a first automatic power control voltage as an operational voltage of said first power amplifier; and radio-frequency compensation control signal outputting means for providing said voltage of a predetermined output level as said reference voltage of said first power amplifier and providing a voltage which is higher than said voltage of predetermined output level as said reference voltage in response to said connection detecting signal.

18. The circuit as claimed in claim 17, wherein said voltage of a predetermined output level boosts an amplifying level of said first power amplifier to compensate for a loss in a radio-frequency signal due to connection of a transmitting path of said first transmitting means to said connecting means.

19. The circuit as claimed in claim 18, wherein said first transmitting means comprises:

a first isolator coupled to an output terminal of said first power amplifier;

a first filter for separating transmitting and receiving signals; and an antenna for propagating an output of said first filter to the atmosphere.

20. The circuit as claimed in claim 19, wherein said radio-frequency compensation control signal outputting means comprises:

first transmitting output level voltage supplying means for providing said voltage of a predetermined output level as the reference voltage of said first amplifying means, switching in response to an input of an inverted first connection signal and cutting off the voltage of a predetermined output level; and second transmitting output level voltage supplying means coupled between said voltage of a predetermined output level and a reference voltage terminal of said first amplifying means, for switching, in response to an input of said connection detecting signal, and supplying an output level selecting voltage which is higher than said voltage of a predetermined output level as said reference voltage.

21. The circuit as claimed in claim 19, wherein said first and second power amplifiers are the same type.

22. The circuit as claimed in claim 19, wherein said second transmitting output control means comprises:

second output detecting means for detecting an output level of said second power amplifier and generating a second feedback voltage corresponding to the detected level; and second amplifying means for amplifying a difference between an output level selecting voltage radio-frequency compensation control signal generating means and said second feedback voltage to generate said second automatic power control voltage as an operational voltage of said second power amplifier.

23. The circuit as claimed in claim 22, wherein said radio-frequency compensation control signal outputting means comprises:

first transmitting output level voltage supplying means for providing said voltage of a predetermined output level as the reference voltage of said first amplifying means, switching in response to an input of an inverted first connection signal and cutting off the voltage of a predetermined output level; and second transmitting output level voltage supplying means coupled between said voltage of a predetermined output level and a reference voltage terminal of said first amplifying means, for switching, in response to an input of said connection detecting signal, and supplying said output level switching voltage which is higher than said voltage of a predetermined output level as said reference voltage.

24. The circuit as claimed in claim 22, wherein said first and second power amplifiers are the same type.

25. The circuit as claimed in claim 23, wherein said connecting means comprises a curly cord for connecting said voltage of a predetermined output level to an input of said first amplifying means, and connecting an output of said first transmitting means to an input of said second power amplifier, and at the same time, providing said connection detecting signal to said first transmitting output control means.

26. The circuit as claimed in claim 25, wherein said radio-frequency compensation control signal outputting means comprises:

first transmitting output level voltage supplying means for providing said voltage of a predetermined output level as the reference voltage of said first amplifying means, switching in response to an input of an inverted first connection signal and cutting off the voltage of a predetermined output level; and second transmitting output level voltage supplying means coupled between said voltage of a predetermined output level and a reference voltage terminal of said first amplifying means, for switching, in response to an input of said connection detecting signal, and supplying said output level selecting voltage which is higher than said voltage of a predetermined output level as said reference voltage.

27. The circuit as claimed in claim 25, wherein said first and second power amplifiers are the same type.

28. The circuit as claimed in claim 1, wherein said radio transmitter is comprised of a portable radio telephone.

29. The circuit as claimed in claim 13, wherein said radio transmitter is comprised of a portable radio telephone and said radio frequency compensating device is mounted in a vehicle.

30. An apparatus for a radio transceiver having a portable radio telephone operating at a predetermined transmission power level and a radio-frequency compensating means, said apparatus comprising:

a curly cord for connecting said portable radio telephone to said radio-frequency compensating means;

said portable radio telephone being operable in response to a supply voltage, said portable radio telephone comprising:

a first antenna;

a first battery for supplying a first battery voltage;

a first power driver for receiving said first battery voltage and for controlling an output of said first battery voltage as said supply voltage in response to a first switching control signal;

first transmitting output control means for generating an output level selecting voltage, for receiving a predetermined output level control voltage, for outputting one of said output level selecting voltage and said predetermined output level control voltage as a reference voltage in response to a connection signal provided in response to said curly cord connecting said portable radio telephone to said radio-frequency compensating means, for receiving a first feedback voltage, and for generating a first automatic power control voltage in response to an amplified difference between said reference voltage and said first feedback voltage;

a first power amplifier for receiving a radio-frequency signal and for power amplifying said radio-frequency signal in response to said first automatic power control voltage for generating a first amplified radio-frequency signal having said predetermined transmission power level;

a first output detector for detecting the level of said first amplified radio-frequency signal to generate said first feedback voltage; and first transmission means for radio transmitting said first amplified radio-frequency signal; said radio-frequency compensating means comprising:

a second antenna;

a second battery for supplying a second battery voltage, said second battery voltage being greater than said first battery voltage;

a second power driver receiving said second battery voltage, and for controlling an output of said second battery voltage to a voltage regulator and said first power driver in response to a second switching control signal, said voltage regulator for converting said second battery voltage to a voltage value equal to said first battery voltage;

second transmitting output control means for generating a second automatic power control voltage in response to an amplified difference between said output level selecting voltage generated by said first transmitting means and a second feedback voltage;

means for receiving said first amplified radio-frequency signal output from said first transmission means and for supplying said amplified radio-frequency signal to a second power amplifier;

said second power amplifier for generating a second amplified radio-frequency signal in response to said second automatic power control voltage, said second amplified radio-frequency signal having said predetermined transmission power level;

a second output detector for detecting the level of said second amplified radio-frequency signal to generate said second feedback voltage; and second transmission means supplying said second amplified radio-frequency signal to said second antenna for radio transmitting said second amplified radio frequency signal.

31. The apparatus as claimed in claim 30, said curly cord comprising:

a jack for connecting said first transmission means to said first antenna for propagating said first amplified radio-frequency signal to the atmosphere;

a plug for disconnecting said first transmission means from said first antenna and for connecting said first transmission means to said means for receiving said first amplified radio-frequency signal output from said first transmission means;

means for connecting a ground of said portable radio telephone to a ground of said radio-frequency compensating means;

means for connecting said second power driver to said first power driver for providing said second battery voltage to said first power driver;

means for connecting said ground of said portable radio telephone to said second power driver for enabling said second power driver to generate said second switching control signal;

means for connecting said ground of said radio-frequency compensating means to a voltage supply line of said portable radio telephone, said voltage supply line providing said supply voltage for said portable radio telephone, for enabling generation of said connection signal; and means for connecting said output level selecting voltage, generated by said first transmitting output control means, to said second transmitting output control means.

32. The apparatus as claimed in claim 31, said first power driver comprising:

an AND gate for receiving said first battery voltage and said second battery voltage for generating said first switching control signal; and a first power switch for providing said first battery voltage to said voltage supply line when said first switching control signal generated by said AND gate has a logic low level, and for providing an output of said voltage regulator to said voltage supply line when said first switching control signal generated by said AND gate has a logic high level.

33. The apparatus as claimed in claim 31, said second power driver comprising:

a power controller connected between said second battery and said means for connecting said ground of said portable radio telephone to said second power driver, said power controller for generating said second switching control signal when said ground of said portable radio telephone is connected to said power controller; and a second power switch connected between said second battery and said first power driver for providing said second battery voltage to said first power driver in response to the generation of said second switching control signal.

34. The apparatus as claimed in claim 32, said second power driver comprising:

a power controller connected between said second battery and said means for connecting said ground of said portable radio telephone to said second power driver, said power controller for generating said second switching control signal when said ground of said portable radio telephone is connected to said power controller; and a second power switch connected between said second battery and AND gate of said first power driver for providing said second battery voltage to said AND gate in response to the generation of said second switching control signal.

35. The apparatus as claimed in claim 31, said first transmitting output control means comprising:

an attenuator for generating said output level selecting voltage in response to 3-bit binary data output from a microcomputer of said portable radio telephone;

a transmitting output controller for selectively providing one of said predetermined output level control voltage to said and said output level selecting voltage as said reference voltage in response to said connection signal; and an amplifier for amplifying a difference between the reference voltage and the first feedback voltage for generating the first automatic power control voltage as an operational voltage of the first power amplifier.

36. The apparatus as claimed in claim 35, said transmitting output controller comprising:

a first switch for receiving said connection signal and said predetermined output level control voltage;

an inverter for receiving said connection signal and for generating an inverted connection signal; and a second switch for receiving inverted connection signal and said output level selecting voltage, one of said first or second switches for outputting said reference voltage.

37. The apparatus as claimed in claim 36, further comprising:

said inverter comprising a first transistor having a gate connected to said supply voltage through a first resistor, said gate being further connected to said means for connecting said ground of said radio-frequency compensating means to said voltage supply line of said portable radio telephone;

said second switch comprising a second transistor having a gate connected to a collector of said first transistor, a second resistor connected between an emitter of said second transistor and said gate of said second transistor, said emitter of said second transistor being connected to receive said output level selecting voltage, and a collector of said second transistor being connected to a terminal for providing said reference voltage;

a variable resistive divider circuit for receiving and dividing said supply voltage for generating said predetermined output level control voltage;

said first switch comprising a resistive divider means connected between said collector of said first transistor and a gate of a third transistor, an emitter of said third transistor being connected to ground, a collector of said third transistor being connected to receive said predetermined output level selecting voltage generated by said variable resistive divider circuit, a fourth transistor having a gate connected to said collector of said third transistor through a third resistor, an emitter of said fourth transistor connected to said collector of said third transistor, and a collector of said fourth transistor being connected to said terminal for providing said reference voltage.

* * * * *

UNITED STATES PATENT AND TRADEMARK OFFICE
CERTIFICATE OF CORRECTION

PATENT NO. : 5,511,234
DATED : 23April, 1996
INVENTOR(S) : Dong- In Ha

It is certified that error appears in the above-indentified patent and that said Letters Patent is hereby corrected as shown below:

Column 16,
Claim 22,

Line 8    after "voltage " insert --generated by said--:

Signed and Sealed this

Seventeenth Day of September, 1996

*Attest:*

BRUCE LEHMAN

*Attesting Officer*    *Commissioner of Patents and Trademarks*